Figure 1:
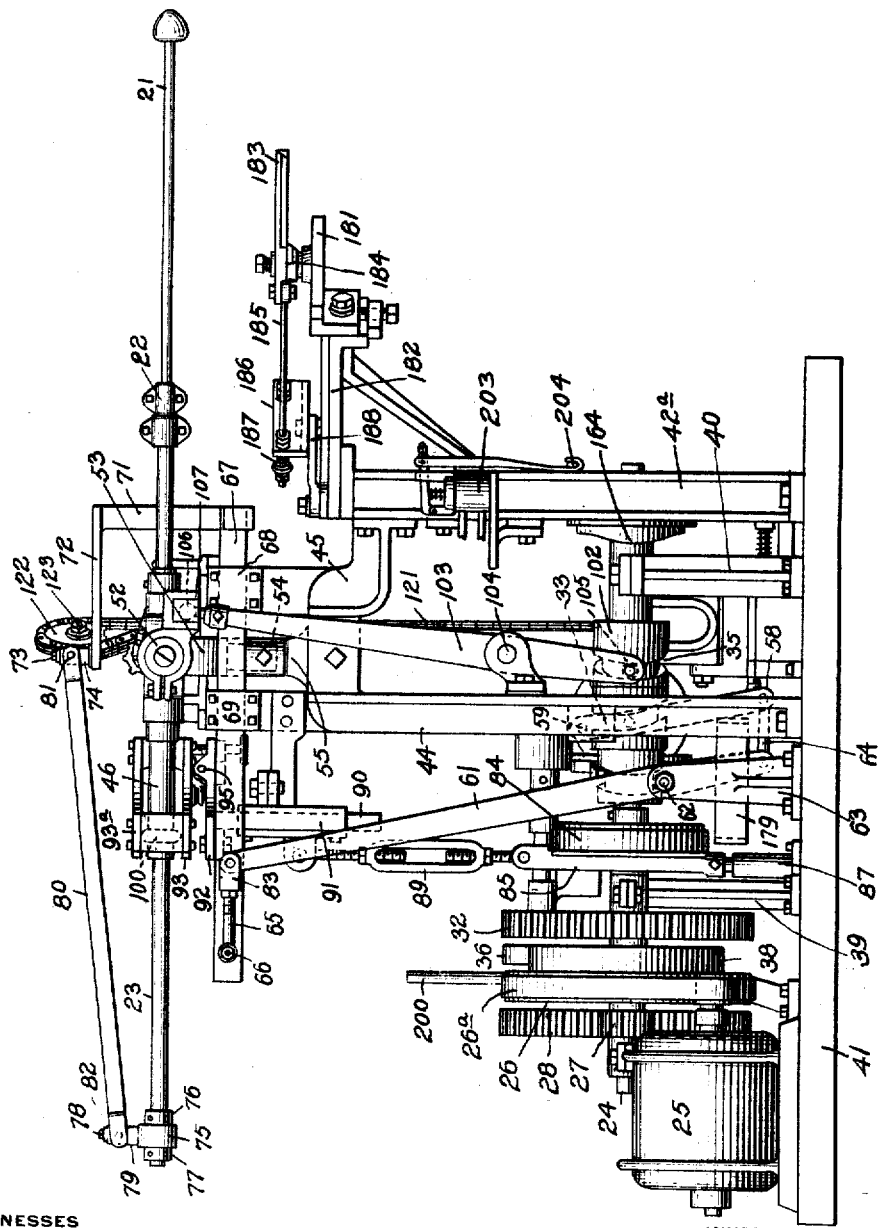

J. O. JENSEN AND J. HENLE.
GLASS GATHERING MACHINE AND PROCESS.
APPLICATION FILED NOV. 21, 1917.

1,304,568.

Patented May 27, 1919.
8 SHEETS—SHEET 2.

WITNESSES

INVENTOR

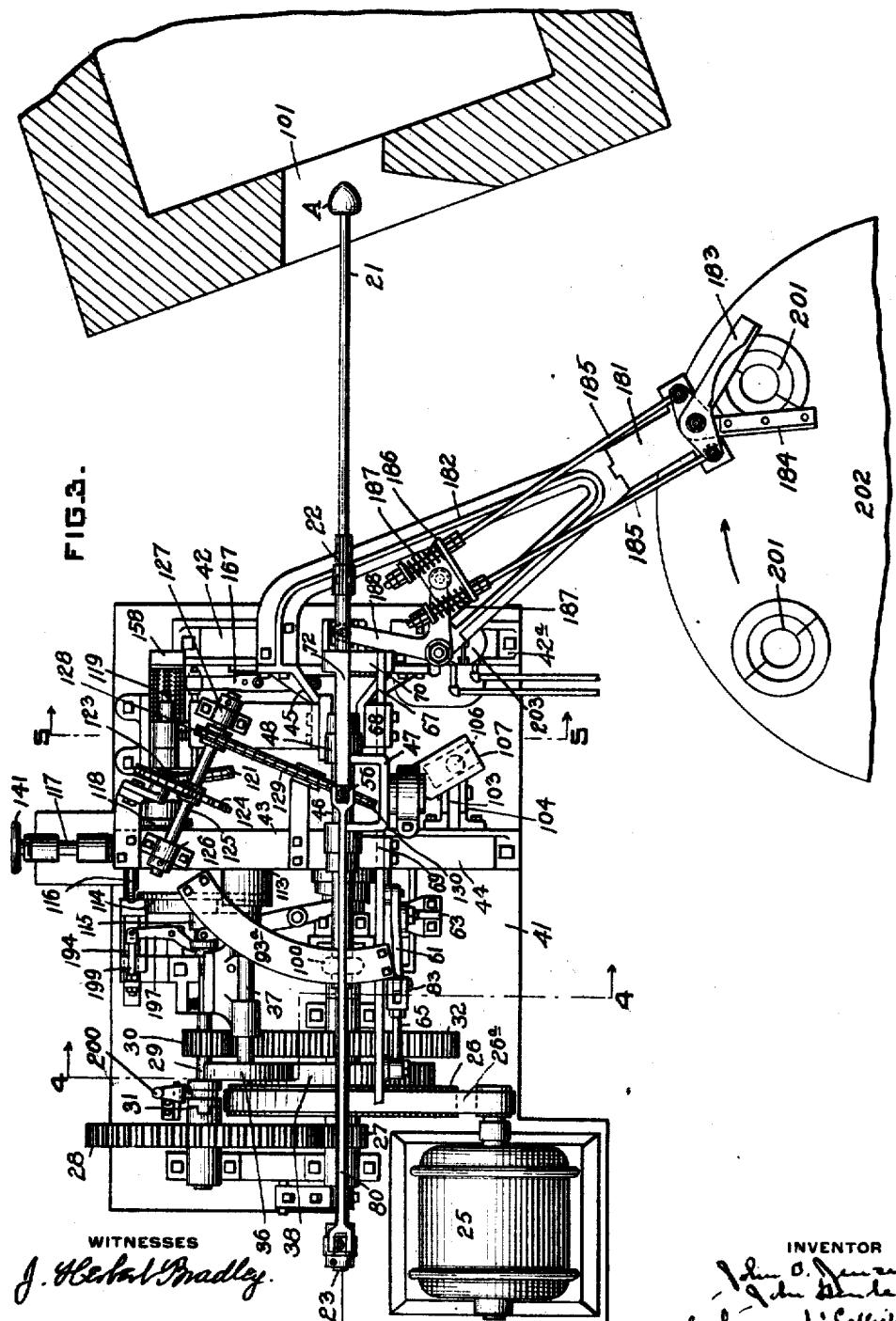

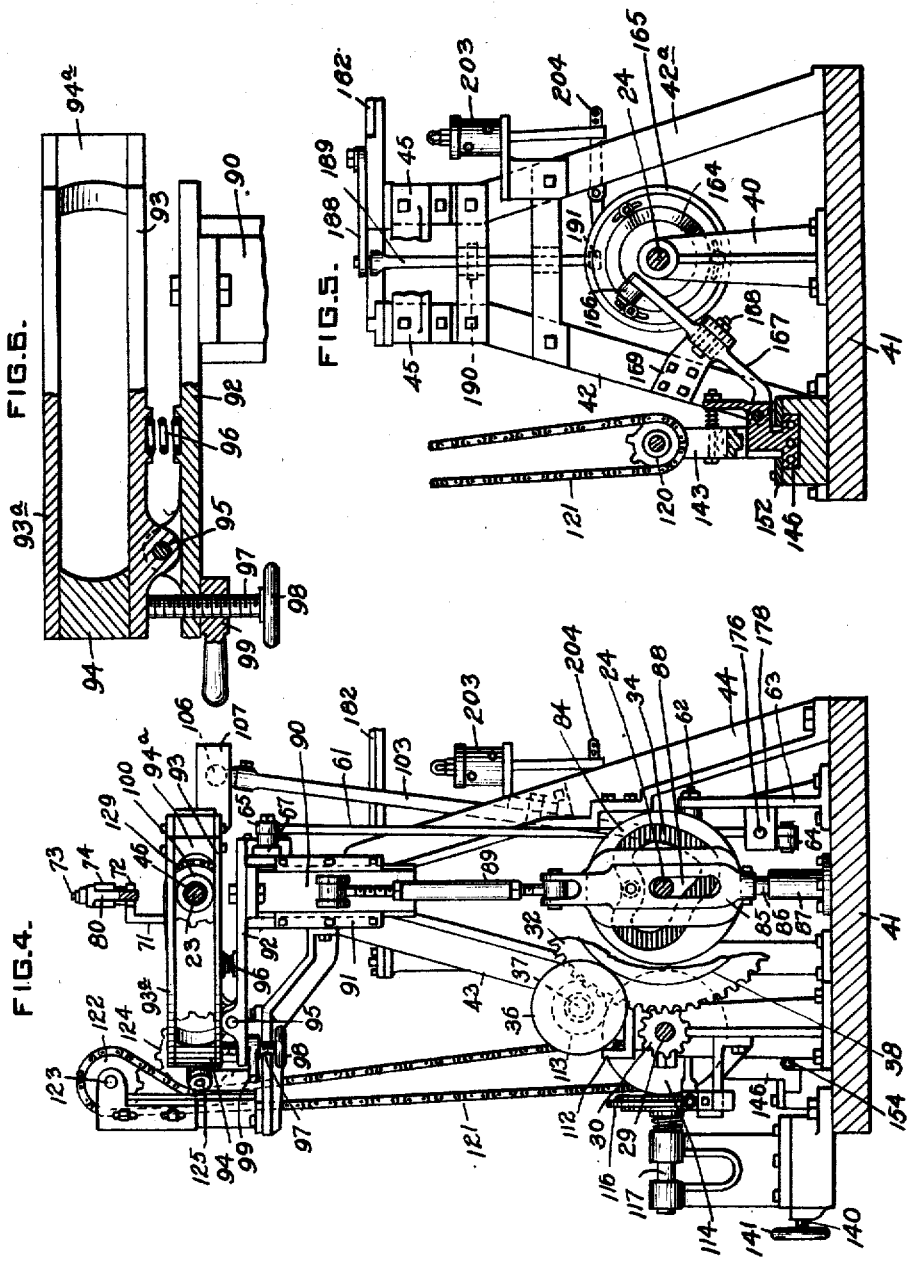

J. O. JENSEN AND J. HENLE.
GLASS GATHERING MACHINE AND PROCESS.
APPLICATION FILED NOV. 21, 1917.
1,304,568.
Patented May 27, 1919.
8 SHEETS—SHEET 5.
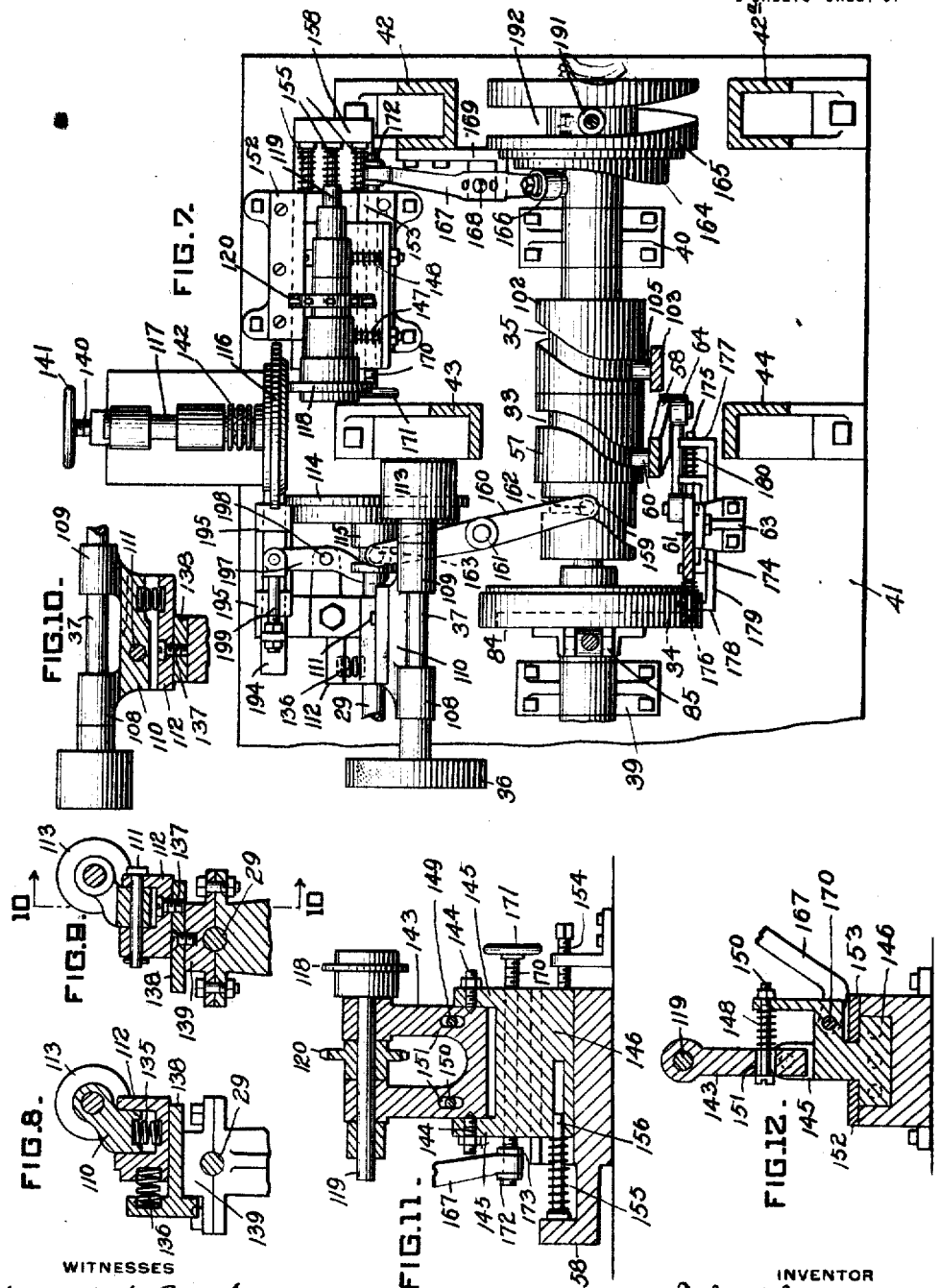
WITNESSES
J. Herbert Bradley
INVENTOR
John O. Jensen
John Henle J. O. JENSEN AND J. HENLE.
GLASS GATHERING MACHINE AND PROCESS.
APPLICATION FILED NOV. 21, 1917.

1,304,568.

Patented May 27, 1919.
8 SHEETS—SHEET 6.

WITNESSES
J. Herbert Bradley.

INVENTOR
John O. Jensen
John Henle
by Green & McCallister
attys.

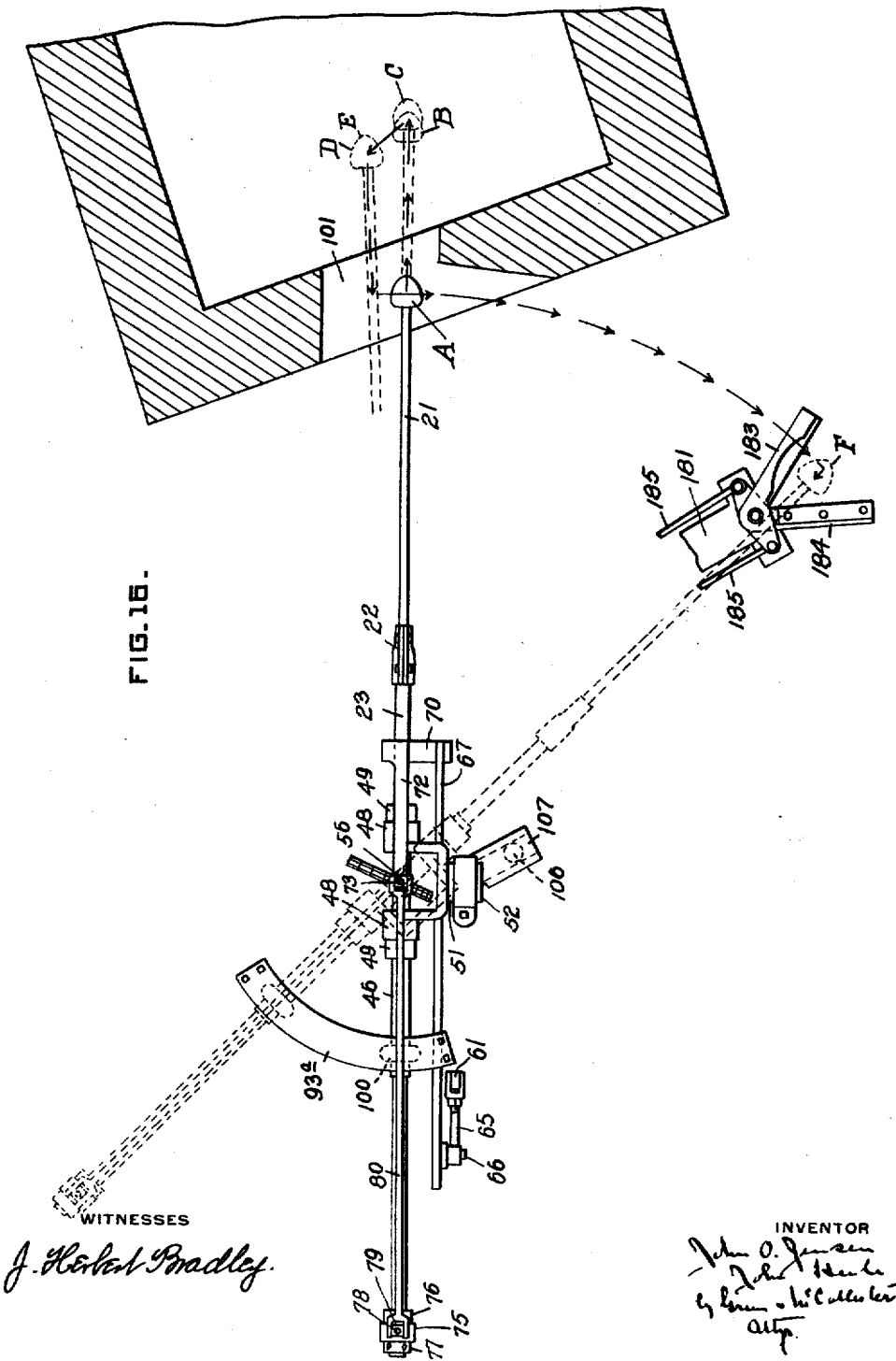

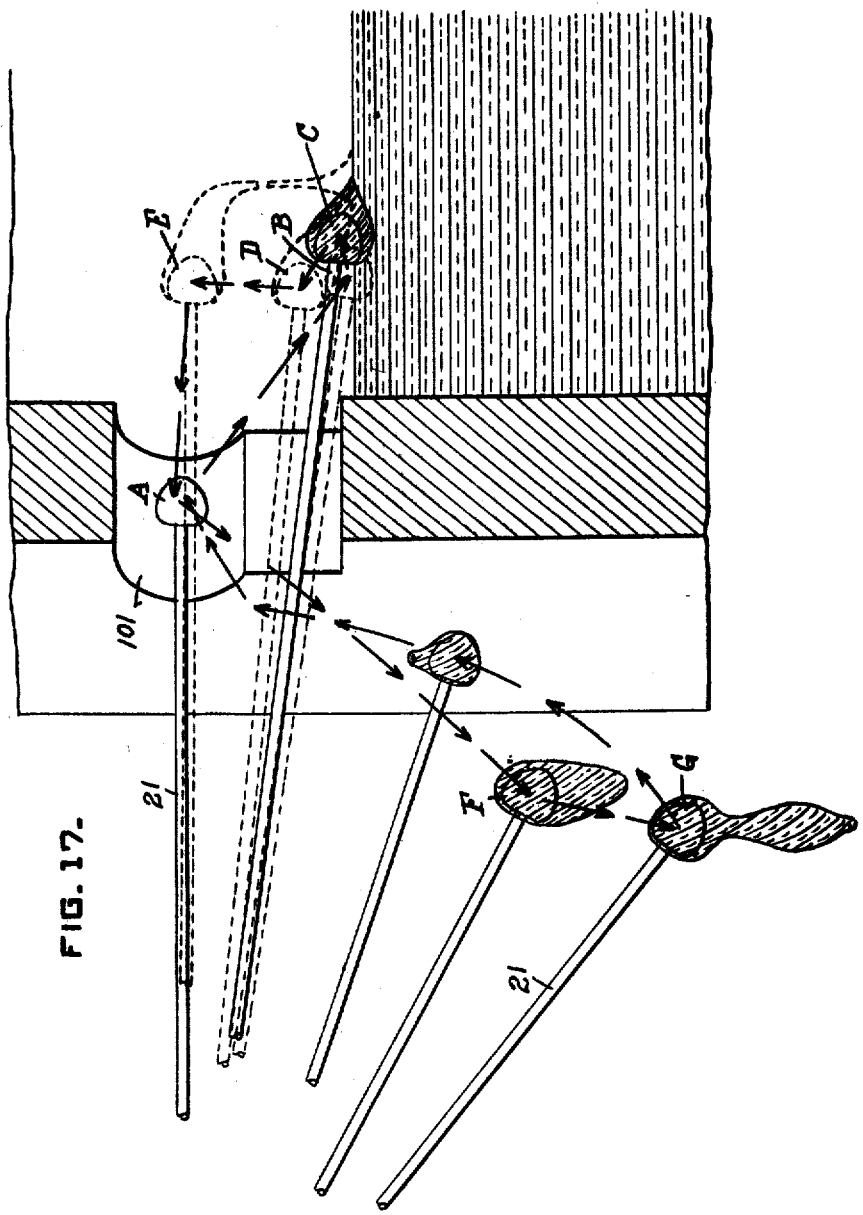

UNITED STATES PATENT OFFICE.

JOHN O. JENSEN AND JOHN HENLE, OF GENEVA, NEW YORK, ASSIGNORS, BY DIRECT AND MESNE ASSIGNMENTS, TO J. O. JENSEN COMPANY, INC., OF GENEVA, NEW YORK, A CORPORATION OF NEW YORK.

GLASS-GATHERING MACHINE AND PROCESS.

1,304,568.  Specification of Letters Patent.  Patented May 27, 1919.

Application filed November 21, 1917. Serial No. 203,142.

*To all whom it may concern:*

Be it known that we, JOHN O. JENSEN and JOHN HENLE, citizens of the United States, and residents of Geneva, in the county of Ontario and State of New York, have made a new and useful Invention in Glass-Gathering Machines and Processes, of which the following is a specification.

This invention relates to the art of gathering glass and to glass gathering machines and particularly to machines in the makeup of which a gathering punty or gathering iron is utilized.

While several practicable machines have been produced for gathering glass by so called suction devices and by ladling or flowing devices, so far as we are aware, no machines utilizing a punty or gathering iron in their makeup, for mechanically gathering glass from the surface of a bath, have ever (before our invention) been produced which operated successfully or were in any sense commercial.

We are aware that numerous machines utilizing punties or gathering irons have been designed and built, but all of them with which we are familiar have developed defects which have rendered them useless.

The primary object of this invention is to provide a new method of gathering glass and a machine or apparatus for automatically carrying out the same and by means of which glass in uniform amounts can be gathered with a punty or gathering iron from the surface of a bath within a furnace or other bath holding agent and delivered in suitable form for utilization in the manufacture of bottles or other glass articles, thereby dispensing with the services of manual gatherers.

A further object is to provide a machine or apparatus by means of which the gathering punty entering into its makeup is manipulated in a manner closely approximating in many of its movements manual or hand manipulation whereby uniform gathers free from blisters are obtained; each gather being of such formation as to provide a tail such as will assist the gather to properly enter the mold or form to which it is delivered.

A still further object is to provide a machine of this character (in which the movements are necessarily complex) of relatively simple construction and in which the various motions and positions of the operating elements are so accurately timed and controlled that the gathers (for each weight of bottle or other article to be produced) are of substantially unvarying amount and more uniform as to weight and form than those incident to manual or hand gathering.

These, as well as other objects which will readily appear to those skilled in this particular art, we attain in the machine or apparatus described in the specification and illustrated in the drawing accompanying this application and forming a part thereof and throughout which similar elements are denoted by like characters.

Figure 2:
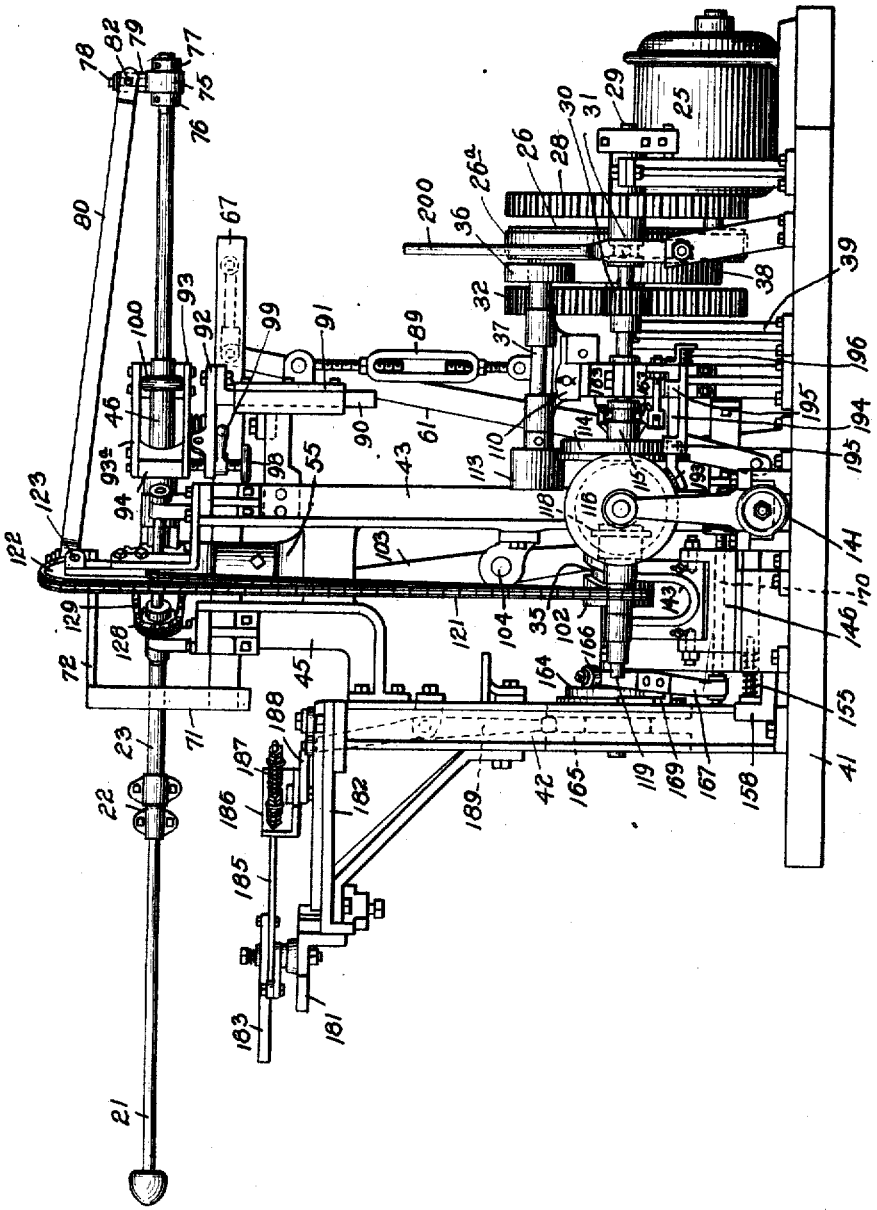
Figure 13:
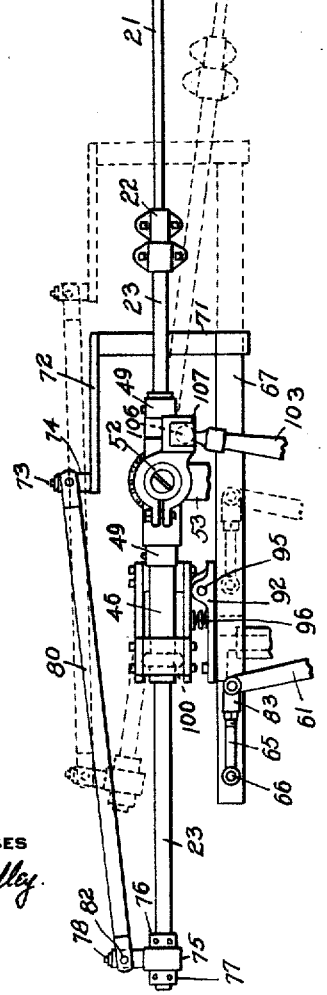
Figure 14:
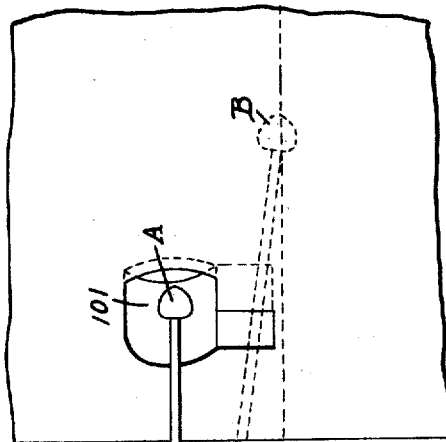
Figure 15:
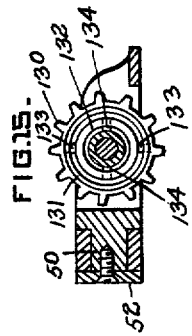

In the drawings, Figure 1 is a view in elevation looking toward the right hand side of the machine embodying this invention. Fig. 2 is a similar view looking toward the left hand side of the machine. Fig. 3 is a top plan view of the machine shown in operative position with relation to the furnace and molds adapted to receive the gathers of glass. Fig. 4 is a sectional elevation taken on line 4—4 of Fig. 3. Fig. 5 is a fragmentary sectional elevation taken on line 5—5 of Fig. 3. Fig. 6 is an enlarged detail view of a portion of the mechanism for regulating the depth of the punty in the bath during the gathering operation. Fig. 7 is a fragmentary cross sectional view of the machine looking down on the same from a point just above the main drive shaft. Figs. 8, 9, 10, 11 and 12 are detail views in sectional elevation of portions of the device associated with the means for rotating the punty; Fig. 10 being taken on line 10—10— of Fig. 9. Fig. 13 is a view in perspective of the punty and the punty manipulating means and illustrates the operation of the punty in entering the furnace and tilting downwardly to the surface of the bath from horizontal position. Figs. 14 and 15 are detail views of portions of the punty manipulating mechanism. Fig. 16 is a more or less diagrammatic plan view and illustrates the lateral movements of the punty during the operation of gathering and delivering the gather and Fig. 17 is a diagrammatic view illustrating the movements of the punty during a complete cycle of operation.

Broadly, the machine or apparatus consists of a gathering punty and mechanisms for manipulating the punty so as to advance it into a furnace or other bath-holding agent; to partially submerge it in the bath of molten glass; to rotate it while partially submerged so as to cover the same and to pick up or gather a definite quota of glass; to advance it during the gathering operation so as to localize the bulk of the gather at the forward end of the punty as required for the best results; to simultaneously raise and move the punty a slight distance to the rear to form a tail or tail-like extremity to the gather for allowing it to easily enter the mold and at the same time to move the punty laterally to one side of the gathering point above the bath so that when the tail is subsequently severed or broken from the bath the thread or strand will sink or fall into the bath at a point removed from the gathering point to minimize the tendency to form blisters and streaks; to raise the punty so that the thread is drawn out; to halt the punty in raised position; to move the punty rearwardly with an accelerated movement to the starting point in the mouth of the furnace to snap the thread and thus sever the gather from the bath; to swing the punty laterally over the delivery point; to move the punty down over the mold or other agent positioned to receive the gather, to sever the gather, and simultaneously with the proper movements as though manually manipulated to rotate the punty at proper varying speeds to first uniformly gather and then to maintain the gather in proper form until deposited. After the gather is severed and deposited the punty is rotated a portion of a revolution (about one half) so that the depending remainder of the gather is placed on top of the punty so that when the punty enters the furnace the heat will soften this portion and round off the edges of the cut. The side movement of the punty in the furnace and the partial rotation after delivery are precautions taken to minimize blisters caused by entrapped air.

It is well understood that in gathering glass from a molten mass or bath by means of a punty or gathering iron, strands are formed extending from the gather to the bath and when these strands are severed or broken the lower portions thereof drop back or sink into the bath and require time for incorporation therewith. In manual or hand gathering the "gatherer" attempts to start each gather at a level point on the surface of the bath free from such strands but in this machine or apparatus which starts each gather at the same point the same result is accomplished by the slight sidewise or lateral movement of the punty in the furnace thus causing the strand or thread to drop back and settle into the bath at a different point or place removed from the gathering point or rather at a different point from that at which the gather is started and to fall away from the gathering point. This sidewise movement of the punty, on account of its being connected to the bath causes the molten glass to flow or move away from the gathering point and to carry with it any strands or other irregularities caused in the gathering operation.

In the machine a punty 21 provided with a knob-like head preferably formed in the usual manner from clay is clamped at 22 to a punty manipulating rod 23 and by this manipulator the necessary movements are given to the punty through the agency of mechanisms operated by suitable devices carried by or driven from a main drive shaft 24 connected to a driving motor 25 (such as electric motor) by means of suitable reduction gearing comprising a pulley 26 loosely mounted on the main shaft 24 and driven from the motor by means of a belt $26^a$. Pulley 26 through its hub carries a pinion 27 which meshes with a gear 28 adapted to be connected to shaft 29 carrying pinion 30 by means of a jaw clutch 31. Pinion 30 meshes with a gear 32 keyed to the main drive shaft.

The main shaft carries the agents which in this case are cams or cam devices for causing the punty to move in the desired paths and at the proper times. Cam groove 33 causes and because of its formation times or controls the longitudinal reciprocations of the punty. Cam groove 34 causes and controls its tilting movements, that is the up and down movements of the punty, and cam groove 35 causes and controls the swinging or lateral movements of the punty. The mechanism for rotating the punty although coördinated for operation with the mechanisms for imparting the other movements thereto in a sense is independent thereof and is frictionally driven by speed reducing and varying devices through the agency of a friction wheel or gear 36 mounted on a shaft 37 and frictionally engaging or meshing with a friction wheel 38 formed as a reduced part of pulley 26.

Main shaft 24 is journaled in suitable bearings carried in standards or bearing posts 39 and 40 mounted on a base plate 41 which carries the driving motor and upon which is also mounted the main frame or supporting structure for the punty manipulator.

The main frame which may be made in any desired manner, in the drawings, consists of supporting posts 42 and $42^a$ at the forward end of the machine and 43 and 44 at the center of the machine. These are connected by means of suitable cross members or braces and a supporting head or platform 45.

Punty manipulator rod 23 is feathered within a tubular sleeve or punty support 46 mounted for rotation in a supporting bracket 47 having arms 48, 48 and is constrained against lengthwise movement by means of collars 49, 49 rigidly secured to the tubular member. The punty manipulator rod is allowed free endwise movement with relation to the tubular member 46 but is caused to rotate therewith by means of the feather. Bracket 47 is provided with a trunnion 50 mounted to oscillate within a bearing 51 and is confined in said bearing by means of an end retaining plate 52.

Bearing 51 for bracket 47 is carried by a supporting arm 53 integral with a trunnion 54 mounted in a bearing formed in an upright extension 55 of frame member 45. Trunnion 54 is capable of oscillation about a vertical axis. Trunnions 50 and 54 are so positioned and correlated that the vertical tilting and lateral swinging movements of tubular member 46 and therefore the punty are about center 56. These two trunnions with their associated supporting brackets, and brackets or arms supported thereby, constitute a universal mounting for the tubular member 46; the movements taking place about center 56.

The longitudinal reciprocating movements of the punty caused and controlled by cam groove 33 in cam member 57, keyed to the main shaft, are transmitted from said cam to the punty manipulating rod 23 through the medium of a lever 58 pivotally mounted on the frame member 44 at 59, a roller 60 carried by the upper end of said lever and bearing in cam groove 33 of cam 57, a lever 61 pivotally mounted at 62 to a standard 63 secured to the base plate, a link 64 connecting the lower ends of levers 58 and 61, a link 65 and a manipulating frame to which said link 65 is pivotally attached at 66. The manipulating frame consists of a rod or bar 67 mounted for reciprocation in guides 68 and 69 secured to the main frame, a cross member 70 rigidly secured to the forward end of rod 67 and an upright 71 provided with a rearwardly extending arm 72. Arm 72 at its rear end carries pin 73 around which a hub 74 is journaled. The outer end of punty manipulator rod 23 loosely carries a connector 75 drilled to accommodate said rod and to allow the same to revolve therein. Rod 23 on either side of connector 75 is provided with fixed collars 76 and 77 and connector 75 is provided with a vertically extending bearing pin 78 on which a hub 79 is journaled. Hubs 74 and 79 are connected by means of a link 80 having bifurcated ends which straddle the hubs and which are pivotally pinned thereto by means of trunnion pins 81 and 82.

From this construction it will be seen that as rod or bar 67 is reciprocated within its brackets, punty manipulator rod 23 will be likewise reciprocated within tubular member 46. The rotatably mounted hubs and the trunnion pins allow universal movement to punty manipulator rod about center 56. The connector 75 rotatably mounted with relation to said rod allows punty manipulator rod 23 to rotate even during said universal movements.

The limits of the longitudinal reciprocating movements of the punty may to a slight extent be adjusted by adjusting bifurcated end 83 of link 65 with relation to the body portion of the link which is provided with screw threads and a lock nut for that purpose.

The tilting movements of the punty caused and controlled by cam groove 34 in cam 84 keyed to the main shaft are transmitted to the punty manipulating rod 23 through the medium of a cross head 85 carried on a rod 86 mounted to reciprocate within a guide cylinder 87 secured to the base plate of the machine. The cross-head near its center is provided with an elongated slot 88 through which main shaft 24 of the machine passes; the slot allowing reciprocation of the cross-head. The cross-head by means of an adjustable link 89 formed in the nature of a turn-buckle to permit adjustment, connects with a second cross-head 90 mounted to reciprocate within a vertical guideway 91. Cross-head 90 at its top carries a punty manipulating connector comprising a base plate 92 bolted to cross-head 90 so as to reciprocate therewith, a track or box-like guide member made up of bottom element 93, top element 93ª and end elements or blocks 94 and 94ª bolted between the top and bottom elements. The box guide near one end thereof is connected to base 92 through a pivotal connection 95. A spring 96 retained between base 92 and bottom element 93 tends to yieldingly lift the outer or right hand end of the guide from base plate 92. An adjustment screw 97 threaded through the inner or left hand end of base 92 bears against the inner or left hand end of bottom plate 93 and by means of this adjustment screw which carries a hand wheel 98 the frame may be tilted on its pivotal connection. A lock nut 99 provided with a handle for easy manipulation locks the adjustment screw in adjusted positions. The box guide is formed on the arc of a circle struck from center 56 as shown in Figs. 3 and 16, and serves as a guide for a curved roller 100 carried on the outer or rear end of tubular member 46.

From this construction it will be seen that as the box guide is reciprocated, or bodily moved up and down through the medium of cam groove 34 and the intermediate mechanism the punty will be tilted up and down.

It will be seen that the tilting movements of the punty will not interfere in any way with the longitudinal reciprocations thereof, since these movements while carried on simultaneously are in a sense independent one of the other.

The swinging of the punty laterally to and from the mouth 101 of the furnace, fore hearth, dog house, or other bath containing receptacle, as the case may be, caused and controlled by cam groove 35 of cam member 102 keyed to the main shaft is effected through lever 103 pivoted at 104 to a suitable bracket carried on the frame of the machine. The lower end of lever 103 carries a roller 105 bearing within the cam groove 35 and a roller 106 is carried on the upper end of the lever. The upper end is preferably ball shaped to allow the roller relative angular movement with relation to the lever to properly slide within a guide 107 secured to the bracket carrying the bearings 51 for trunnion 52.

As lever 103 is reciprocated or swung about its pivotal point by its cam, bracket 53 is oscillated on its vertical pivot and the punty caused to travel or swing from the mouth of the furnace to the delivery point or where the gather is severed and deposited in the mold. It will be understood that the connection between guide bracket 107 and the upper end of lever 103, that is the curved roller mounted on the ball-like end of the lever, allows the roller to freely slide lengthwise of the guide as the bracket 53 is oscillated. This mechanism also moves the punty sidewise in the furnace from position C to position D.

The means for rotating the punty is driven from friction gear 38 and comprises various friction gears, sprockets and chains as well as cams carried by the main shaft 24 of the machine for controlling the periods of rotation and varying the speeds thereof.

Friction wheel 36 which meshes with or frictionally engages friction wheel 38 is carried by shaft 37 journaled in suitable bearings 108 and 109 in a frame 110 pivotally mounted on a pin 111 carried in a supporting bracket 112. The inner end of shaft 37 carries a broad faced friction wheel 113 which frictionally engages a friction wheel mounted on shaft 29. This friction wheel is provided with a hub portion 115 drilled to receive shaft 29 which at its opposite end carries pinion 30 of the main driving mechanism of the machine and one element of said clutch 31. The friction gear 114 with its hub 115 is mounted so as to have free endwise movement with relation to shaft 29 and independent movement of rotation with relation thereto and merely utilizes shaft 29 as a mounting member.

Friction gear 114 at times, or during the rotation of the punty, frictionally engages a friction disk 116 carried on a shaft 117 and said disk in turn frictionally engages a friction gear 118 carried on shaft 119 which near its center carries a sprocket wheel 120.

Sprocket 120 by means of a chain 121 carried by an idler sprocket 122 mounted on a stub shaft 123 secured to the upper portion of the supporting frame drives a sprocket 124. Sprocket 124 which meshes with the outside of said drive chain 121 is carried on a jack shaft 125 journaled in bearings 126 and 127 carried by a cross member of the main frame structure; shaft 125 also carries a sprocket 128 for a chain 129 which rotates tubular member 46 through a sprocket 130 mounted for universal movement thereon.

Sprocket 130 is preferably shrunk onto a ring 131 which is pivotally mounted on a ring 132 by means of trunnion pins 133, 133. Ring 132 is pivotally mounted on tubular member 46 by means of trunnion pins 134, 134, secured to the tubular member; pins 134 standing at right angles to trunnion pins 133, 133. Sprocket 130 while it rotates member 46 is allowed universal movement with relation thereto about center 56.

Springs 135 and 136 are provided for maintaining proper frictional contact between friction wheels 36 and 38 and between friction wheels 113 and 114. Bracket 112 carrying pin 111 for pivotally mounting the frame 110 which carries shaft 37, is mounted for pivotal movement about vertical bearing pin 137 threaded into a plate 138 carried by a bearing standard 139 which supports shaft 29 in suitable bearings carried thereby. Spring 135 tends to swing bracket 110 about pivot pin 111 causing friction wheel 113 to make gripping contact with friction wheel 114, and spring 136 tends to swing bracket 112 about its vertical pivot pin 137 causing friction wheel 36 to make gripping contact with friction wheel 38.

Shaft 117 carrying friction wheel 116 may be adjusted endwise by means of a screw 140 having a hand wheel 141. A thrust bearing 142 is provided between said friction disk and its adjusting means so as to allow said wheel to freely rotate. The endwise adjustment of this disk provides for proper frictional contact between it and friction wheel 114, the mounting shaft 29 of which is fixed.

Shaft 119 carrying friction wheel 118 and sprocket 120 is mounted for rotation in a yoked bracket 143 pivotally mounted on bearing pins 144, 144 which are threaded through upstanding portions 145, 145 of a sliding carriage 146.

The upper portion of yoke bracket 143 and therefore friction wheel 118 is yieldingly held toward friction disk 116 by means of springs 147, and 148 which surround pins 149 and 150, respectively, which pass through elongated slots 151, 151 formed in bracket 143 for the reception of such pins.

Carriage 146 is mounted to slide in guideways 152, 153 secured to base plate 41 and the movement of said carriage toward the center of friction disk 116 is limited by an adjustable screw threaded stop member or bolt 154, against the free end of which said carriage abuts when at the inner limit of its movement.

Carriage 146 is yieldingly forced toward said adjustable stop 154 by means of springs 155 which surround suitable pins 156 carried by an end flange 158 of the bed of the guideway for carriage 146.

Friction wheel 114 until such times as it is desired to rotate the punty stands out of engagement with friction disk 116 and a cam groove 159 formed in a cam member 159ª keyed to the main shaft 24 of the machine causes and controls the movement of friction wheel 114 across the face of friction disk 116. A lever 160 pivoted at 161 carries at one end a roller 162 bearing in said cam groove 159 and at the other end is bifurcated and carries two bearing pins 163, 163 which ride within an annular groove in hub portion 115 of the gear wheel 114. From this construction it will be seen that as cam member 159ª is rotated friction gear member 114 will be moved longitudinally of shaft 29 and caused to travel back and forth across the face of friction disk 116 and in contact therewith.

Cam groove 159 is formed so that friction wheel 114 will not drive friction disk 116 until the punty in moving from position A to position B has reached position B, but is formed so that when the punty does reach position B and the punty is lowered into the bath friction wheel 114 will be moved on shaft 29 to make contact with friction disk 116 and rotate the punty through the train of driving mechanism between said friction disk and the punty. It will be understood that the nearer friction wheel 114 moves toward the center of disk 113 the faster will said disk be rotated.

The speed of rotation of the punty is also controlled by a cam 164 formed on the face of cam member 165 mounted on the main shaft of the machine. Cam 164 bears against a roller 166 carried by one end of a lever 167 pivoted at 168 to a supporting arm 169 carried by post 42. The other end of the lever is adjustably secured to the outer end of a connecting rod 170 provided with a hand wheel 171. Rod 170 is threaded through carriage 146, and lever 167 is drilled to loosely accommodate said rod and is held in place thereon between two adjusting nuts 172 and 173. The lever 167 by means of the cam 164 is adapted to move carriage 146 away from stop 154 against the stress of springs 155 to increase the speed of rotation of the punty. By adjusting rod 170 with relation to the carriage the limits of movement of the carriage 146 are determined. As another means of limiting the inward movement of carriage 146, that is movement toward the center of friction disk 116, stop 154 is found desirable as a positive stop since there may be some play in the connections between cam 164 and the carriage, that is, play in the roller 166 and between lever 167 and the adjustment nuts 172 and 173.

Standard 63 below pivotal point 62 of lever 61 carries a cushioning means for the lever 61. This consists of a yoke 174 carrying pins 175 and 176 which pass through holes drilled in arms 177 and 178 of a yoke 179. Springs 180 surround these pins and lie between the arms of the two yokes and tend to yieldingly hold the lower end of lever 61 against movement and thereby cushion the lever as it reaches its limits.

The shears for severing the gather from the punty at the delivery point of the gather, are mounted on an adjustable base 181 carried on a bracket 182 secured to post 42 of the frame. The shear mechanism consists of shear blades 183, 184 pivotally mounted in a supporting base 181, and, from the angular ends of the shear blade rods 185 extend back to a head 186 to which they are secured by cushioning springs 187. Head 186 is pivotally secured to one end of a bell crank lever 188 the other end of which is connected to the upper end of a lever 189 pivotally mounted on a cross member of the main frame at 190 and which at its lower end carries a roller 191 bearing in cam groove 192 formed in cam member 165.

A brake shoe 193 preferably having a leather face is utilized for braking friction disk 116 at the proper times. The brake shoe is carried on an extension of a rod 194 mounted to slide in guides 195 and is yieldingly held out of engagement with friction wheel 116 by means of a spring 196. A lever 197 pivoted at 198 is operatively connected with hub 115 of friction gear 114 at one end and at its other end connects with rod 194 by means of a connecting rod 199. From this construction it will be seen that as friction wheel 114 engages friction disk 116 the brake shoe wil be removed from the edge of disk 116 and the disk allowed to rotate. Upon reverse movement of friction wheel 114 the brake will be applied and the train of mechanism for rotating the punty stopped.

Clutch 31 for starting and stopping the machine is operated by lever 200.

Tubular member 46 serves as a universal support or mounting arranged to swing about two axes intersecting one another at right angles. The point of intersection which is point 56 lies in the axis of the punty rod and about this center the punty has universal movement.

The punty is of the same construction as the gathering tool commonly used in manual gathering, consisting of a shaft or stem having a knob-like extremity preferably formed of clay, the size of which determines the amount of weight of the gather. The several positions of the punty and the movements thereof during the complete gathering operation are diagrammatically illustrated in Fig. 17.

The punty normally stands at position A which may be termed the starting position and which corresponds to a point just inside the furnace opening where the punty is maintained at an efficient working temperature.

While the punty is preferably located at position A preparatory to starting the machine and the machine is stopped with the punty in that position it will be understood that its operation is continuous, the gathering cycles following one another without interruption so long as the machine is in operation.

The travel of the punty from A to B in a downwardly inclined path as indicated in Figs. 13 and 16 places the punty in what may be termed the covering position B where its endwise movement is momentarily halted. The lowering of the punty to partially submerged position B is sufficiently slow to prevent the trapping of air which would form blisters. During this forward movement from A to B the punty is not rotated; rotation does not begin until the punty has reached the desired depth of submergence. After rotating at position B sufficiently to cover the punty (the speed of rotation being relatively slow and for about one complete revolution) the covered and partially submerged rotating punty commences to rotate faster and is advanced to gathering position C. Now the rotating punty (its speed having been increased) is moved backward and sidewise to the left of the covering and gathering position B and C to position D as shown in Figs. 16 and 17 and coincident with said sidewise and backward movement the punty is elevated to withdraw the body of the gather from the bath although being connected therewith by a tail-like extension (still rotating fast) without halting at position D the punty is now raised by a straight upward movement to position E (speed now being reduced) thinning out the tail to form the thread. After about four complete revolutions have been made (the number depending upon the quality or consistency of the glass, its speed having been reduced) after momentarily stopping the bodily movement of punty at position E the punty moves from position E to position A with a quick movement (still rotating slowly) which serves to snap the thread and completely sever the tail from the bath.

The punty in moving to positions D and E to the left of covering point B and gathering point C carries the portion of the tail or thread connected with the bath to the left so that after the tail is severed the portion connected to the bath falls away from the covering and gathering positions B and C so as to be incorporated in the bath at a point removed therefrom. After the gather has reached position A in its backward movement the punty is swung on its vertical pivot to position F and at F the punty is lowered to position G where the gather is severed.

The gather carrying punty continues to rotate during its travel from E to A and from A to F. If the glass is hard the rotation of the punty will be stopped prior to reaching position F so that the gather will have time to flow down into proper shape for entering the mold. If the glass is soft the punty will rotate, although the speed may be slow, until position F is reached; the adjustment will depend upon the consistency of the glass. As soon as the punty reaches position G the shears are operated and the severed gather drops into the mold. As soon as the gather has been severed by the shears the punty is turned a half revolution placing the cut on top of the punty so that when the punty again enters the furnace the cut will, by the heat within the furnace, be softened and flow downward to make an even and regular covering for the punty.

From position G the punty is moved back to position A where it is stopped if the operation is to be interrupted. If the operation is to be repeated the punty will immediately move from position A to covering position B and so on.

Each of the movements incident to the gathering operation is made effective by the appropriate mechanism for accomplishing the same coöperating with its cam member on the main shaft of the machine and it will be understood that two or more movements occur simultaneously during certain portions of the operation and that each movement is effected or accomplished without interfering with the other movements.

The endwise or forward movement of the punty from position B to C and the simultaneous backward sidewise and upward movements from C to D are characteristic features of the operation in what is believed to be its most successful adaptation. After covering the punty at position B it is desirable to locate the bulk or main body of the gather at or in advance of the front end of the punty and the accomplishment of this is facilitated by the slight forward movement from B to C which results in accumulating the glass on the punty at the point desired. The backward movement from C to D which occurs simultaneously with elevating the body of the gather and moving it sidewise results in elongating the gather from the extremity of the punty, placing the bulk thereof in the most advantageous position, forming the tail necessary for presentation to the mold, and insuring level covering and gathering positions. This sidewise movement, on account of the connection between the punty and the bath, sets up currents which carry the irregularities away from the covering and gathering positions B and C.

The described manipulations result in withdrawing and supporting the gather without so lapping or displacing the glass as to produce scars or marks in the finished ware and without pocketing air in the glass which causes blisters. The accelerated outward movement from E to A snaps the tail or thread, producing a clean cut gather.

While the cycle of movements of the punty as above described may be variously modified without departing from the invention, the gather forming manipulation incident to positions B, C, D and E and the accelerated movement from E to A as well as the partial rotation at G after the gather is severed placing the cut portion of the gather on the top of the punty, are believed necessary for accomplishing the best results. The adjusting means for the box guide on its pivot, serve to determine the extent to which the punty is submerged in the bath at positions B and C. An adjustment that results in elevating the right hand end of the guide increases the depression of the punty with corresponding increase of submergence in the bath. This may be readily varied while the machine is in operation.

The gathered glass may be variously used in the manufacture of glass articles, the gather dropping from the shears into molds or other appliances. The apparatus is particularly well adapted for delivering glass for the manufacture of bottles and such an adaptation is diagrammatically shown in Fig. 3 wherein molds 201 mounted on a mold carrier 202 are adapted to be moved successively to position beneath the shears.

Semi-automatic or intermittently operating glass forming machines are well known in the art wherein the forming mechanism moves through a complete cycle after being set in operation by pressure from the gatherer's punty after delivering the gather to the mold, the machines being actuated in a number of ways, as for instance by compressed air in which the pressure of the punty serves to operate a starting valve. A machine of this general type is illustrated in the patent to F. J. Mackin, No. 904,975, of November 24, 1908. The gathering machine of the present invention is adapted for use in conjunction with a forming machine of the character indicated. The operating mechanism is allowed to trip the starting valve 203 immediately following the operation of the shears to set in motion the forming machine. When thus arranged the machine of the present invention completely displaces the skilled gatherer heretofore employed for gathering the glass, delivering it to the forming machine and for starting the latter on its cycle of operation. The starting valve 203, which is tripped by a pin or cam member 165, through lever 204, will be operatively connected to the forming machine mechanism. When thus arranged the two machines will work in synchronism. In some cases the operating motor of the present machine may be omitted and the machine connected up to the forming machine.

In accordance with the provisions of the patent statutes we have described the principle of operation of our invention, together with the device which we now consider to represent the best embodiment thereof, but we desire to have it understood that the device shown is only illustrative and that the invention can be carried out in other ways.

Having thus described our invention, what we claim as new and desire to secure by Letters Patent is—

1. In a glass-gathering machine, a pivotally mounted punty and punty-actuating mechanism so combined therewith as to cause the punty to enter a bath of molten glass, to rotate and advance to pick up a gather and then move backward and thereafter swing laterally to deliver the gather, characterized in that the punty-actuating mechanism is constructed so as to cause the punty at a definite time in its backward movement to simultaneously move to one side of the gathering point and to a point above the bath for the purpose of clearing the gathering point.

2. In a glass-gathering machine, a pivotally mounted punty and punty-actuating mechanism so combined therewith as to cause the punty to enter a bath of molten glass, to rotate and advance to pick up a gather and then move backward and thereafter swing laterally to deliver the gather, characterized in that the punty-actuating mechanism is constructed so as to cause the punty to move backward obliquely to its line of entry to a point above the bath and to one side of the gathering point; said oblique movement occurring during the formation of the tail.

3. In a glass-gathering machine, a pivotally mounted punty and punty-actuating mechanism so combined therewith as to cause the punty to enter a bath of molten glass, to rotate and advance to pick up a gather and then move backward and thereafter swing laterally to deliver the gather, characterized in that the punty-actuating mechanism includes a cam formed so as to cause the punty to move backward obliquely to its line of entry to a point above the bath and to one side of the gathering point, such oblique movement occurring during the formation of the tail to the gather.

4. In a glass-gathering machine, a pivotally mounted punty and punty-actuating mechanism so combined therewith as to cause the punty to enter a bath of molten glass, to rotate and advance to pick up a gather and then move backward and thereafter swing laterally to deliver the gather, characterized in that the punty-actuating mechanism is constructed and timed so as to move the punty vertically while the gather is still connected to the bath, and is given a backward movement while in raised position of sufficient speed to snap the thread formed by raising the punty.

5. In a glass-gathering machine, a pivotally mounted punty and punty-actuating mechanism so combined therewith as to cause the punty to enter a bath of molten glass, to rotate and advance to pick up a gather and then move backward and thereafter swing laterally to deliver the gather, characterized in that the actuating mechanism is constructed and timed so as to rotate the punty less than an entire revolution from the time the gather is delivered until the punty is again entered in the bath.

6. In a glass-gathering machine, a pivotally mounted punty and punty-actuating mechanism so combined therewith as to cause the punty to enter a bath of molten glass, to rotate and advance to pick up a gather and then move backward and thereafter swing laterally to deliver the gather, characterized in that the punty-actuating mechanism is constructed and timed so as to cause the punty to rotate slowly while being covered, more rapidly while gathering and during the formation of the tail, and again slowly while snapping the thread and carrying the gather to the delivery point.

7. In a glass gathering machine, the combination of a punty, mechanism for rotating the punty, means for reciprocating and swinging the punty vertically and horizontally, the whole operating for the purpose of carrying out successive cycles in each of which the punty is entered in a bath of molten glass, is rotated and advanced to pick up a gather and is moved backward and thereafter swung laterally to deliver the gather, means combined in the punty rotating mechanism adapted to accelerate the speed of rotation after the punty is covered, while advancing to collect the gather and during the formation of the tail and again slowly while snapping the thread and carrying the gather to the delivery point, means adjacent the delivery point for severing the gather from the punty, and means operating synchronously with the punty for operating said severing means.

8. In a glass gathering apparatus, a punty, punty operating mechanism associated therewith whereby successive cycles are automatically carried out and in each of which the punty is entered in a bath of molten glass until partially submerged, is rotated to cover the same and advanced to collect a gather and is moved backward and thereafter swung laterally to deliver the gather, means adjacent the delivery point and connected to operate synchronously with said punty operating mechanism for severing the gather from the punty, and means included in the punty operating mechanism constructed and timed to rotate the punty less than an entire revolution from the time the gather is severed until the punty is again entered in the bath.

9. In a glass gathering apparatus, a punty, mechanism associated therewith whereby successive cycles are automatically carried out and in each of which the punty is entered in a bath of molten glass until is partially submerged, is rotated to cover the same and advanced to collect a gather and is moved backward and thereafter swung laterally to deliver the gather, means adjacent the delivery point and connected to operate synchronously with said mechanism for severing the gather from the punty, and means included in said mechanism constructed and timed to place the cut above the horizontal center of the punty when the punty is again entered in the bath.

10. In a glass gathering apparatus wherein successive cycles are automatically carried out and in each of which a punty is entered in a bath of molten glass, is rotated and advanced to pick up a gather and is moved backward and thereafter swung laterally to deliver the gather, means adjacent the delivery point and connected to operate synchronously with the punty operating mechanism for severing the gather, and means included in the punty operating mechanism constructed and timed to give the punty but a partial rotation between the time the gather is severed and the punty is again entered in the bath.

11. In a glass gathering apparatus, a pivotally mounted punty, a series of synchronously operating cam devices, means controlled by said cam devices and operatively connected with said punty whereby the punty is entered in a bath of molten glass, is advanced to gather and is moved backward to form a tail to the gather and is thereafter swung laterally to deliver the gather, punty rotating means including friction gearing and driving means between said gearing and said punty and cam operated devices for controlling the operation of said friction gearing adjusted so that said gearing is caused to rotate the punty slowly while being covered, more rapidly while gathering and during the formation of the tail and again slowly while severing the gather from the bath and carrying the gather to the delivery.

12. In a glass gathering apparatus, a punty, means associated therewith whereby successive cycles are automatically carried out and in each of which the punty is entered in a bath of molten glass, is rotated to cover the same, is then advanced to collect a gather, is then moved backward to form a tail to the gather and then upward to thin out the tail forming a thread and thereafter swung laterally to deliver the gather, means for rotating the punty including friction gearing, driving means between said gearing and said punty and cam operated devices for controlling the operation of said gearing formed so that said gearing is caused to rotate the punty slowly while being covered, more rapidly while gathering and during the formation of the tail and again slowly while severing the gather from the bath and carrying the gather to the delivery point.

13. In a glass gathering apparatus, a punty, means associated therewith whereby successive cycles are automatically carried out and in each of which the punty is entered in a bath of molten glass, is rotated to cover the same, is then advanced to collect a gather, is then moved backward to form a tail to the gather and then upward to thin out the tail forming a thread and thereafter swung laterally to deliver the gather, means for rotating the punty including friction gearing, chain and sprocket driving means between said gearing and said punty, and cam operated devices for controlling the operation of said gearing formed so that said gearing is caused to rotate the punty slowly while being covered, more rapidly while gathering and during the formation of the tail and again slowly while severing the gather from the bath and carrying the gather to the delivery point.

14. In a glass gathering machine, a punty mounted for movement about horizontal and vertical axes, cam operated devices coördinated to swing said punty about said axes, means for moving said punty endwise, and means for operating said punty, said punty operating means comprising friction gearing and cam controlled agents for starting and stopping said friction gearing and for varying the speed of rotation of the punty by shifting said gearing to vary the relative angular velocities thereof.

15. In a glass gathering machine, a punty, synchronously operating cam devices for rotating said punty operatively combined with said punty whereby it is caused to enter a bath of molten glass, is advanced and then moved backward and thereafter swung laterally, and means for rotating said punty comprising driving mechanism, friction gearing and cam controlled agents for starting and stopping said friction gearing and for varying the speed of rotation of the punty.

16. In a glass gathering apparatus, a punty, means for mounting the punty so as to allow movement thereof about vertical and horizontal axes, means whereby the punty is entered in a bath of molten glass until partially submerged, is rotated and advanced to cover and pick up a gather and is moved backward to form a tail to the gather and thereafter swung laterally to deliver the gather, a vertically reciprocating guide within which the punty moves laterally and which controls the punty movements about its horizontal axis, and means for adjusting the upper and lower limits of movement of said guide.

17. In a glass gathering apparatus, a punty support mounted for movement about horizontal and vertical axes, a punty manipulator mounted for reciprocation within said support and rotation therewith, a curved guide for said support concentrically arranged with relation to the inter-section of said axes, means for swinging said support about its vertical axis to carry the punty manipulator rod back and forth within said guide, means for reciprocating said guide to swing said punty manipulator rod about said horizontal axis, means for rotating the punty manipulator rod, means for adjusting the upper and lower limits of movements of the manipulator rod about the horizontal axis, and means for operating said manipulator rod and a punty secured to said rod.

18. In a glass gathering apparatus, a punty mounted for movement about horizontal and vertical axes, a curved guide for said punty concentrically arranged with relation to the intersection of said axes, means for swinging said punty about its vertical axis to carry it back and forth within said guide, means for reciprocating said guide to swing said punty about its horizontal axis, means for rotating the punty, and means for adjusting the upper and lower limits of movement of the punty about its horizontal axis.

19. The method of making repeated gathers of glass from a molten bath by means of a punty, which consists in presenting the punty above the bath and partially submerging the same, in slowly rotating the punty to cover the same, in accelerating the speed of rotation and at the same time moving the punty forward and upward to collect and place the gather, in moving the punty backward to a point above the bath and laterally to one side of the point of partial submergence thereby forming a tail to the gather, in raising the punty thereby thinning out the tail whereby a thread is formed, in moving the punty backward with a quick movement while in raised position thereby snapping the thread, then in delivering the gather in returning the punty to its original position and then in making another gather from the same point in the bath.

20. The method of making repeated gathers of glass from a molten bath by means of a punty, which consists in partially submerging the punty, rotating the same, increasing its speed of rotation and simultaneously therewith advancing the punty to collect and place a gather, in moving the punty laterally to one side of the point of partial submergence and backward to a position above the bath and simultaneously therewith increasing its speed, and then raising the punty by a straight upward movement thereby thinning out the tail thus forming a thread, in moving the punty backward with a quick movement thereby snapping the thread, in swinging the punty to the delivery point of the gather, in controlling the operation thereof so as to cause the gather to shed downwardly, in severing the gather and then in returning the punty to its original position and making another gather.

21. That step in the art of making repeated gathers of glass from a molten bath by means of a punty, which consists in entering the punty at the same point in the bath during successive operations and after the gather is collected and during the formation of the tail by backward movement, moving the punty obliquely to a point above the bath and to one side of the gathering point whereby the tail remaining attached to the bath after the gather is severed is caused to fall away from the gathering point.

In testimony whereof, we have hereunto subscribed our names this 6th day of Nov., 1917.

JOHN O. JENSEN.
JOHN HENLE.

Witnesses:
C. A. JENSEN,
GEO. F. LAWS.

Copies of this patent may be obtained for five cents each, by addressing the "Commissioner of Patents, Washington, D. C."